United States Patent
Thinket Selvan

(10) Patent No.: US 11,480,214 B2
(45) Date of Patent: Oct. 25, 2022

(54) BEARING ASSEMBLY OF A HINGE COUPLING A FIRST COMPONENT AND A SECOND COMPONENT

(71) Applicant: Airbus Operations SAS, Toulouse (FR)

(72) Inventor: Arumugam Thinket Selvan, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 16/911,433

(22) Filed: Jun. 25, 2020

(65) Prior Publication Data
US 2020/0408254 A1    Dec. 31, 2020

(30) Foreign Application Priority Data
Jun. 28, 2019   (EP) ..................... 19305872

(51) Int. Cl.
*F16C 23/04*   (2006.01)
*B64D 45/00*   (2006.01)

(52) U.S. Cl.
CPC ...... *F16C 23/04* (2013.01); *B64D 2045/0085* (2013.01); *F16C 2326/43* (2013.01); *F16C 2350/54* (2013.01)

(58) Field of Classification Search
CPC ........ F16C 11/04; F16C 11/045; F16C 17/10; F16C 17/18; F16C 17/20; F16C 17/022; F16C 23/04; F16C 23/045; F16C 23/043; F16C 2233/00; F16C 2326/43;
(Continued)

(56) References Cited

U.S. PATENT DOCUMENTS

| | | | | |
|---|---|---|---|---|
| 3,516,136 A | * | 6/1970 | Turner | F16C 23/045 29/898.07 |
| 3,594,851 A | * | 7/1971 | Swatton | F16C 11/045 16/276 |
| 4,054,337 A | * | 10/1977 | Matt | F16B 33/06 384/299 |

(Continued)

FOREIGN PATENT DOCUMENTS

| | | | |
|---|---|---|---|
| CA | 2204901 A1 * | 5/1996 | |
| CA | 3033754 A1 * | 9/2019 | B64C 13/30 |

(Continued)

*Primary Examiner* — James Pilkington
(74) *Attorney, Agent, or Firm* — Greer, Burns & Crain. Ltd.

(57) ABSTRACT

A bearing assembly of a hinge coupling first and second components includes an outer ring secured to the second component having an axial primary bore with a primary inner surface. An inner ring axially rotates, and has a primary outer surface rollingly contacting the primary inner surface, defining a primary sliding path with a primary friction coefficient. The inner ring includes a secondary axial bore with a secondary inner surface. An inner shaft in the secondary bore is secured to the first component and is axially rotatable. The inner shaft has a secondary outer surface rollingly contacting the secondary inner surface defining a secondary sliding path with a second friction coefficient. One of the sliding paths has a triboelectric layer surface frictionally generating an electrical current when that sliding path is engaged. A transmission element transmits, to a failure detection system, a signal due to such electrical current.

13 Claims, 4 Drawing Sheets

(58) Field of Classification Search
CPC .... F16C 11/0695; F16C 33/583; F16C 33/60; B64C 25/08; B64C 2009/005; B64C 2045/085
See application file for complete search history.

(56) References Cited

U.S. PATENT DOCUMENTS

| | | | | |
|---|---|---|---|---|
| 8,562,237 | B2* | 10/2013 | Pina Lopez | F16C 11/0614 403/131 |
| 8,596,582 | B2* | 12/2013 | Uchida | B64C 9/02 244/213 |
| 2006/0120644 | A1* | 6/2006 | Smith | F16C 23/04 384/276 |
| 2007/0292062 | A1* | 12/2007 | Arnold | F16C 23/08 384/206 |
| 2010/0150485 | A1* | 6/2010 | Kleibl | F16C 35/02 384/192 |
| 2011/0038739 | A1* | 2/2011 | Sabha | F04B 1/324 417/222.1 |
| 2017/0370417 | A1* | 12/2017 | Richardson | F16C 11/0695 |

FOREIGN PATENT DOCUMENTS

| | | | | |
|---|---|---|---|---|
| CN | 100380015 C | * | 4/2008 | ............ F16C 11/08 |
| CN | 105682948 A | * | 6/2016 | ............ B60D 1/24 |
| CN | 108791820 A | * | 11/2018 | |
| CN | 110116813 A | * | 8/2019 | ......... F16C 11/0695 |
| CN | 110650889 A | * | 1/2020 | ............ B64C 13/18 |
| WO | WO-2006056171 A1 | * | 6/2006 | ......... F16C 11/0614 |

\* cited by examiner

BEARING ASSEMBLY OF A HINGE COUPLING A FIRST COMPONENT AND A SECOND COMPONENT

CROSS-REFERENCES TO RELATED APPLICATIONS

This application claims the benefit of the European patent application No. 19305872.4 filed on Jun. 28, 2019, the entire disclosures of which are incorporated herein by way of reference.

FIELD OF THE INVENTION

The invention relates to a bearing assembly of a hinge coupling a first and a second component. In particular, the present invention relates to a bearing assembly of a hinge implemented in a lifting and/or flight assisting device of an aircraft. Notably, the bearings are designed with two sliding paths called, respectively, primary sliding path and secondary sliding path, and a triboelectric detector configured to detect which of primary and the secondary sliding path is engaged.

BACKGROUND OF THE INVENTION

Lift and/or flight assisting devices (hereafter "movable component") such as flaps, rudder, and landing gear in aircraft are generally fitted with low friction bearings. The rotation of movable component around an axis is therefore easier, and makes it possible to reduce the actuation load.

For safety reasons, the bearings are generally designed with a primary sliding path and a secondary sliding path having, respectively, a primary coefficient of friction and a secondary coefficient of friction higher than the primary one.

In normal operating conditions, the rotational movement occurs through the primary sliding path. However, in case of failure of the primary sliding path, the rotational movement is insured through the secondary sliding path.

In other words, the secondary sliding path acts as a backup.

Such a bearing assembly of a hinge coupling a first component and a second component known from prior art is illustrated in FIG. 4 of US Patent Application 2007/0292062.

The bearing assembly comprises:

an outer ring, mechanically secured to the first component, and having a primary bore extending along a main axis XX' and delimited by a primary inner surface;

an inner ring, arranged to rotate around the main axis XX', and having a primary outer surface in rolling contact with the primary inner surface, so that it defines with the primary inner surface the first sliding path associated with a primary friction coefficient, the inner ring further comprises a secondary bore extending along the main axis XX' and delimited by a secondary inner surface;

an inner shaft, mechanically secured to the second component, the inner shaft being arranged to rotated around the main axis XX' and disposed in the secondary bore, the inner shaft having a secondary outer surface in rolling contact with the secondary inner surface so that it defines with the secondary inner surface the secondary sliding path associated with the secondary friction coefficient.

Such a bearing assembly is, however, hidden inside the structure of the aircraft which renders its inspection very difficult and, in particular, makes it difficult to determine if the primary sliding path is working properly or not.

Furthermore, the secondary sliding path, which is not as robust as the primary one, necessitates increasing the load on actuators, and is more sensitive to wear, which ultimately can lead to component failure.

It is therefore an object of the present invention to provide a bearing assembly of a hinge for which it is possible to detect at an early stage the jamming or the failure of the primary sliding path.

It is also an object of the present invention to provide a bearing assembly for which the remaining lifetime can be estimated.

SUMMARY OF THE INVENTION

The aforementioned objects are, at least partly, achieved by a bearing assembly of a hinge coupling a first component and a second component, the bearing comprising:

an outer ring, mechanically secured to the second component, and having a primary bore extending along a main axis XX' and delimited by a primary inner surface;

an inner ring, arranged to rotate around the main axis XX', and having a primary outer surface in rolling contact with the primary inner surface, so that it defines with the primary inner surface a primary sliding path associated with a primary friction coefficient, the inner ring further comprises a secondary bore extending along the main axis XX' and delimited by a secondary inner surface;

an inner shaft, mechanically secured to the first component, the inner shaft being arranged to rotated around the main axis XX' and disposed in the secondary bore, the inner shaft having a secondary outer surface in rolling contact with the secondary inner surface so that it defines with the secondary inner surface a secondary sliding path associated with a second friction coefficient;

one of the split path, among the primary and the secondary sliding path, is associated with a triboelectric layer coated on one of the surfaces defining the considered sliding path, so that when the sliding path is engaged the triboelectric layer generates, by friction, an electrical current, the bearing further comprises transmission means configured to transmit, to a failure detection system, a signal associated with the electrical current that is likely to be generated by the triboelectric layer.

According to one embodiment, the transmission means comprise a RFID transponder configured to send the signal to the failure detection system via a receiver, advantageously the electrical current likely to be generated by the triboelectric layer is also used to power the RFID transponder.

According to one embodiment, the second friction coefficient is lower than the primary friction coefficient so that the secondary sliding path engages when rotation according to the primary sliding path fails.

According to one embodiment, the signal that is likely to be received by the receiver indicates which of the primary sliding path and the secondary sliding path is engaged.

According to one embodiment, the triboelectric layer is coated on one of the surfaces defining the primary sliding path, so that while the bearing assembly is in operation, if no signal is received from the transmission means by the failure detection system means that the primary sliding path is in failure.

According to one embodiment, the triboelectric layer is coated on one of the surfaces defining the secondary sliding path, so that while the bearing assembly is in operation, if a signal is received from the transmission means by the failure detection system means that the primary sliding path is in failure.

According to one embodiment, in case of failure of the primary sliding path, the failure detection means are configured to emit a default alert.

According to one embodiment, the failure detection means are connected to a prediction module configured to collect the signal received by the failure detection means and calculate the remaining lifetime of the sliding path to which the triboelectric layer is associated with.

According to one embodiment, the operation of the bearing assembly is actuated with an actuator for which load is optimized depending on the sliding path engaged.

According to one embodiment, the primary inner surface is spherically concave and the primary outer surface is spherically convex.

According to one embodiment, the triboelectric layer comprises at least one of the chemical compound chosen among: WCCo, WCCoCr, TiN, CoCrMo, CuAlFe, CuNiIn, Molybdenum, WC—C:H, Nickel Phosphorous, Chromium plating.

According to one embodiment, the second component is a lift or flight assisting device of an aircraft, and the first component is the fuselage or a wing or the fin of the aircraft.

According to one embodiment, the second component comprises at least one of the component chosen among: flap, rudder, landing gear, aileron, doors.

BRIEF DESCRIPTION OF THE DRAWINGS

Other characteristics and advantages shall appear in the following description of embodiments of a bearing assembly of a hinge according to the invention, given by way of non-limiting examples, in reference to the annexed drawings wherein.

DETAILED DESCRIPTION OF THE PREFERRED EMBODIMENTS

The present invention concerns a bearing assembly of a hinge coupling a first component and a second component.

The first component is, for instance, an aircraft and, in particular, a wing, the fuselage or the fin of the aircraft, whereas the second component is a lift or a flight assisting device.

The bearing assembly according to the present invention further comprises a triboelectric layer coated on one of the surfaces defining a primary or a secondary sliding path of the bearing assembly. Notably, the triboelectric layer generates an electrical current when the split path to which it is associated with is engaged.

By "sliding path," it is meant a movement between two surfaces in contact, and particularly in rolling contact, of a bearing assembly. Notably, a bearing can comprise an outer ring having an inner surface, and an inner ring having an outer surface in rolling contact with the inner surface an defining a sliding path which corresponds to a rotational movement.

By "sliding path engaged," it is meant that the surfaces defining the considered sliding path are in relative movement.

The triboelectric layer is, according to the present invention, coupled with transmission means configured to transmit a signal associated with an electrical current likely to be generated by friction of the triboelectric layer when the sliding path to which is associated with is engaged. In particular, the signal indicates which of the primary sliding path and the secondary sliding path is engaged while the bearing assembly is in operation.

Therefore, the consideration of the triboelectric layer in combination with the transmission means make it possible to determine if the primary sliding path is in default or in failure. This failure diagnostic does not require any intervention or inspection of the bearing assembly, and allows, at an early stage, the detection of any malfunction of the bearing assembly.

Figure 1A:
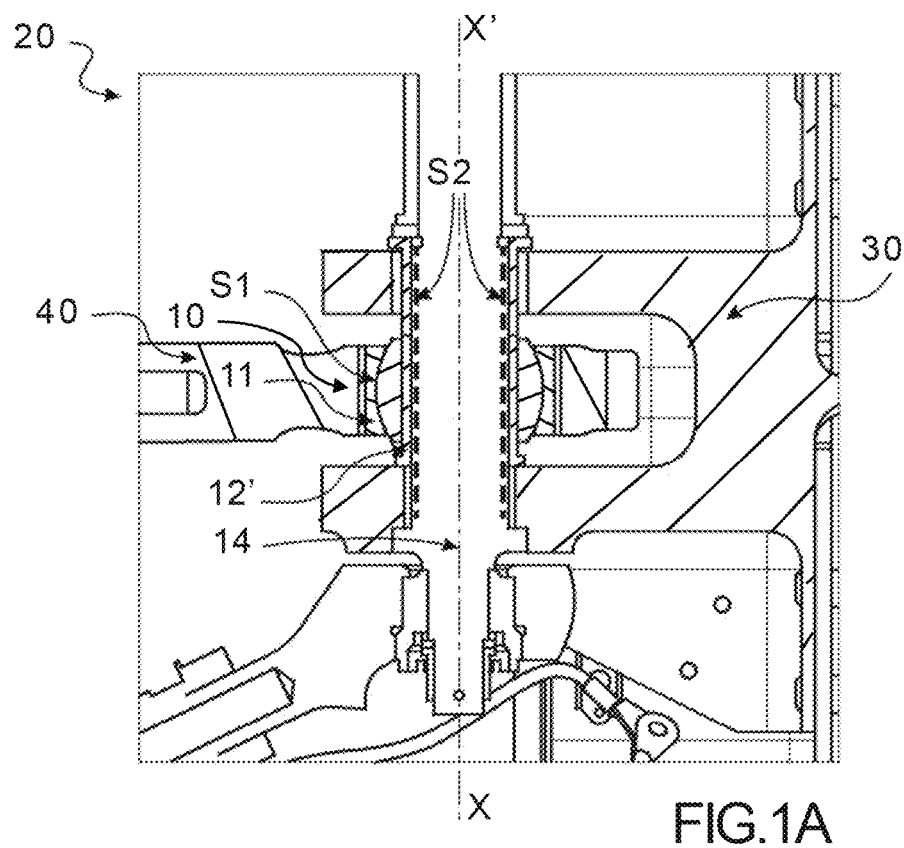
FIG. 1A is a diagrammatic representation, in a perspective view, of a bearing assembly of a hinge coupling a first component and a second component according to the present invention.

FIG. 1A is a diagrammatic representation of a bearing assembly 10 of a hinge 20 coupling a first component 30 and a second component 40.

It is therefore understood that the coupling of the first 30 and the second 40 component by the hinge is configured so that the second component 40 can rotate around the main axis XX' with respect to the first component 30.

The first component 30 is, for example, an aircraft, and, in particular, the fuselage, a wing or the fin of the aircraft.

The second component 40 can be a lift or a flight assisting device, and may comprise a flap, a rudder, a landing gear.

Figure 2:
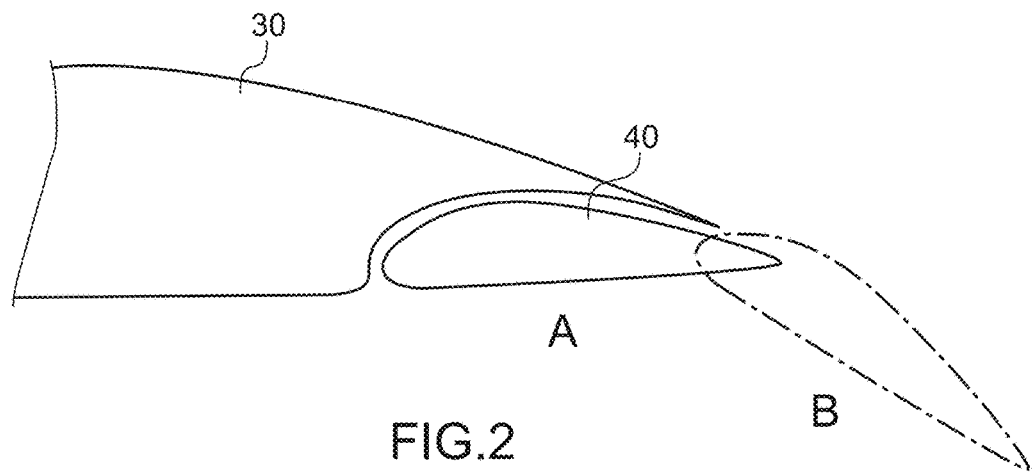
FIG. 2 is a diagrammatic representation of a lift assisting device, for instance a Fowler flap, coupled to the wing of an aircraft.

To this regard, FIG. 2 depicts a wing 30 coupled with a flap 40 in retracted state (A), and in extended state (B).

Figure 4A:
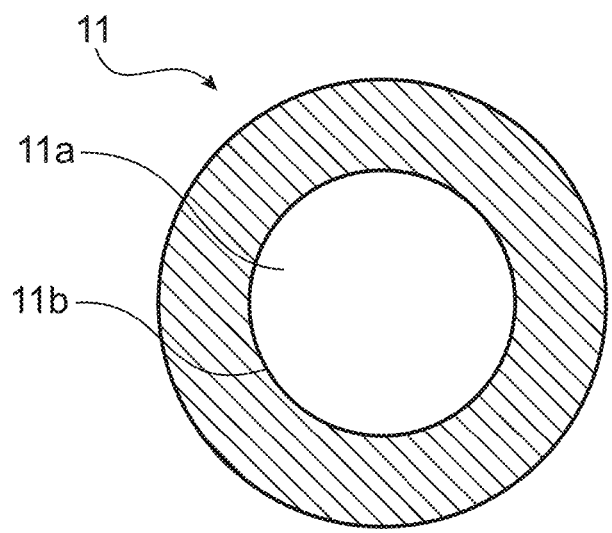
FIG. 4A is a diagrammatic representation, in cross section (perpendicular to the main axis XX'), of an outer ring of the bearing according to a second embodiment of the present invention.

The bearing 10 comprises an outer ring 11 (FIG. 4A) having a primary bore 11a extending along the main axis XX'. The outer ring 11 is mechanically secured to the second component 40, for example as described in US 2007/0292062.

The primary bore 11a is delimited by a primary inner surface 11b.

Figure 4B:
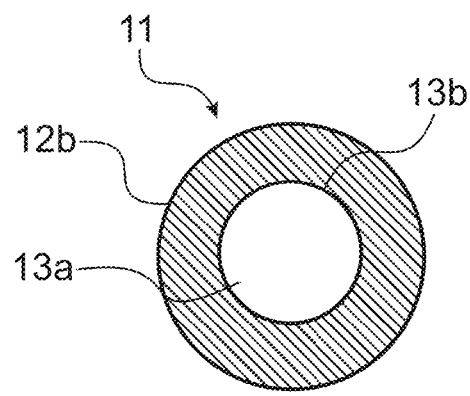
FIG. 4B is a diagrammatic representation, in cross section (perpendicular to the main axis XX'), of an inner ring of the bearing according to a second embodiment of the present invention.

The bearing 10 comprises also an inner ring 12 (FIG. 4B) which comprises a primary outer surface 12b in rolling contact with the primary inner surface 11b and is arranged to rotate around the main axis XX'. In other words, the inner ring 12 is disposed in bore 11a, and both the primary inner surface 11b and the primary outer surface 12b have a cylindrical symmetry around the main axis.

The rolling or the rotation of the primary outer surface with respect to the primary inner surface around the main axis XX' defines a primary sliding path S1. The primary sliding path is associated with a primary friction coefficient.

In a particularly advantageous embodiment, the primary inner surface 11b is spherically concave and the primary outer surface 12b is spherically convex.

The inner ring 12 further comprises a secondary bore 13a extending along the main axis XX' and delimited by a secondary inner surface 13b.

Figure 4C:
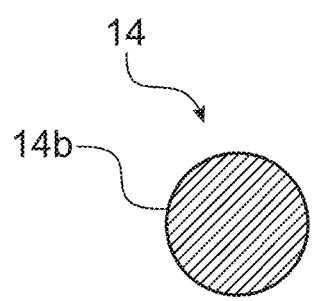
FIG. 4C is a diagrammatic representation, in cross section (perpendicular to the main axis XX'), of a shaft of the bearing according to a second embodiment of the present invention.

The bearing assembly also comprises an inner shaft 14 (FIG. 4C) mechanically secured to the first component 30 disposed in the secondary bore 13a, and which comprises a secondary outer surface 14b in rolling contact with the secondary inner surface 13b. In other words, the inner shaft is disposed in the secondary bore 13a and is arranged to rotate around the main axis XX'.

The rolling or the rotation of the secondary outer surface 14b with respect to the secondary inner surface 13b around the main axis XX' defines a secondary sliding path S2. The secondary sliding path S2 is associated with a second friction coefficient.

A bush 12', mechanically secured to the primary inner ring 12 can be intercalated in between the primary inner ring 12 and the shaft 14.

The secondary sliding path may be arranged so that it engages only when the primary sliding path is in default or in failure. For this purpose, the primary friction coefficient may be lower than the second one.

However, the invention shall not be limited to this aspect, and mechanical components, like blocking or securing pins, may be considered. To this regard, the skilled in the art can consult US Patent Application 2007/0292062.

Figure 3A:
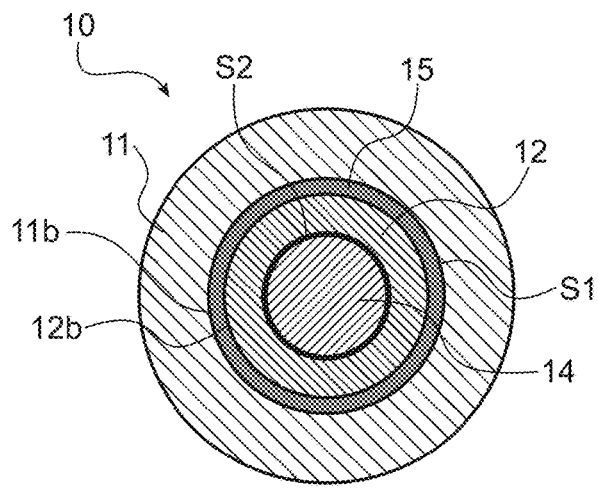
FIG. 3A is a diagrammatic representation, in cross section (perpendicular to the main axis XX'), of the bearing according to a first embodiment of the present invention.
Figure 3B:
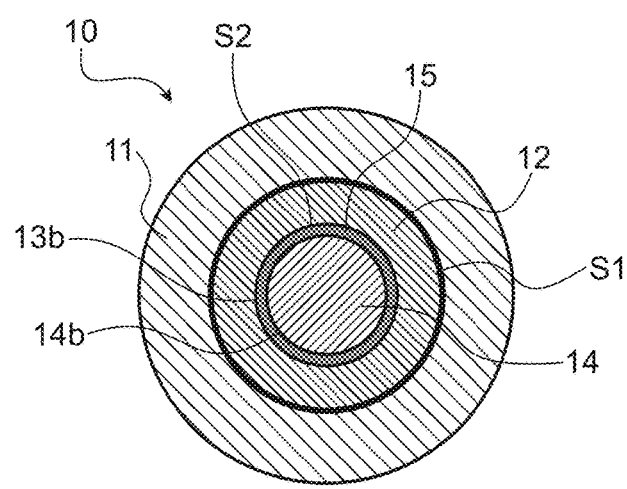
FIG. 3B is a diagrammatic representation, in cross section (perpendicular to the main axis XX'), of the bearing according to a second embodiment of the present invention.

The bearing assembly according to the preset invention comprises a triboelectric layer 15 (FIGS. 3A and 3B).

In particular, one of the split path, among the primary S1 and the secondary S2 sliding path, is associated with the triboelectric layer 15 coated on one of the surfaces defining the considered sliding path, so that when the sliding path is engaged the triboelectric layer generates, by friction, an electrical current.

Depending on the surface to which it is coated, the triboelectric layer 15 can comprise at least one of the chemical compounds chosen among: WCCo, WCCoCr, TiN, CoCrMo, CuAlFe, CuNiIn, Molybdenum, WC—C:H, Nickel Phosphorous, Chromium plating.

The counterpart surface in contact with the triboelectric layer 15 can be coated or produced with a suitable material to increase the triboelectric activity such as polytetrafluoroethylene, glass fiber, nylon etc.

The bearing comprises also transmission means 50 configured to transmit a signal associated with the electrical current that is likely to be generated by the triboelectric layer 15.

In particular, the transmission means 50 may comprise a RFID transponder, and advantageously the electrical current likely to be generated by the triboelectric layer 15 can be used to power the RFID transponder.

Figure 1B:
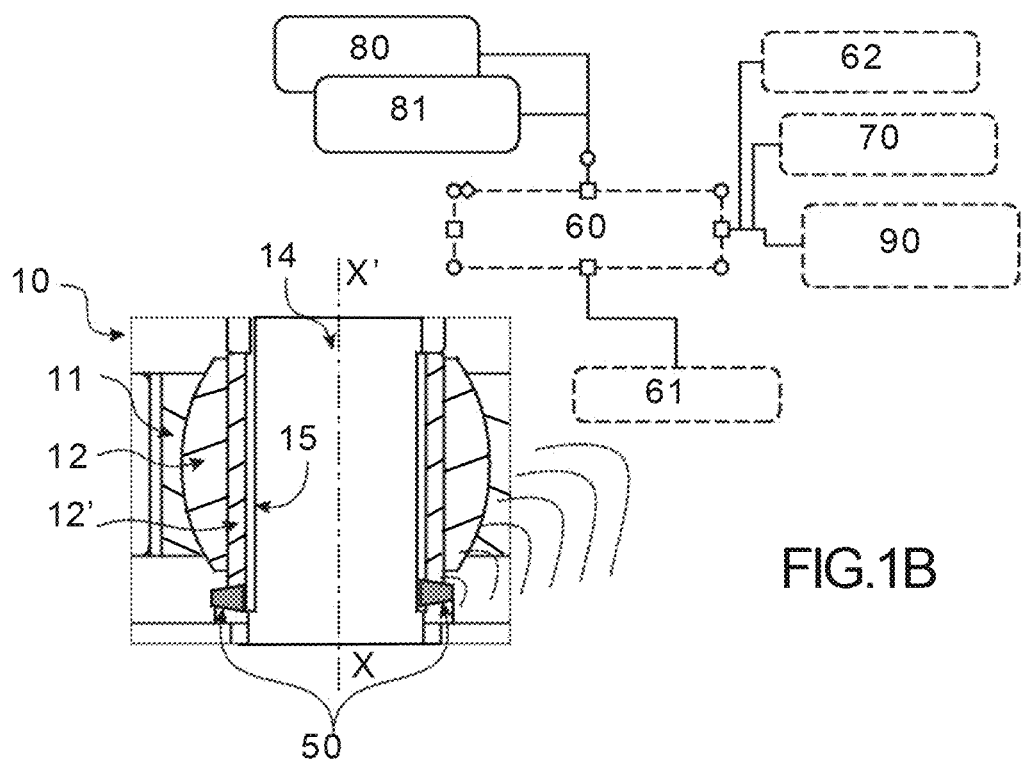
FIG. 1B is a diagrammatic representation of the bearing of FIG. 1A.
Figure 1C:
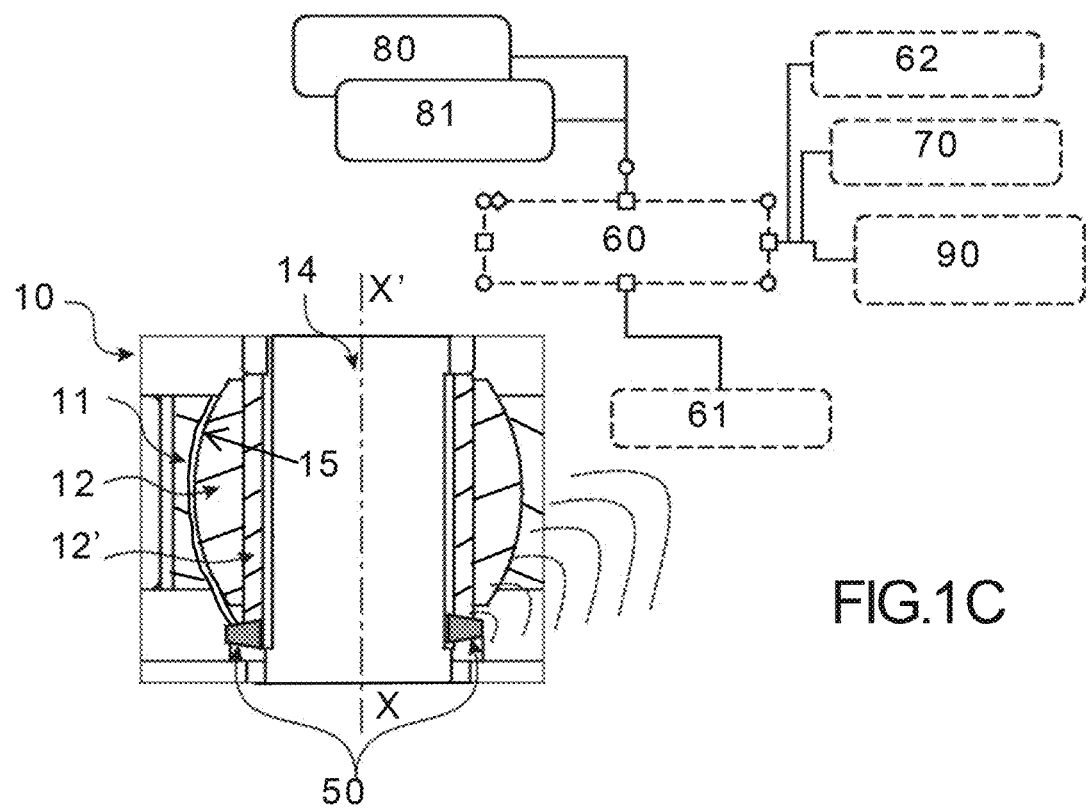
FIG. 1C is a diagrammatic representation of a bearing according to a second embodiment according to the present invention.

According to a first embodiment of the present invention illustrated in FIGS. 1C and 3A, the triboelectric layer 15 can be coated between the outer ring 11 and the primary inner ring 12, on one of the primary inner surface 11b and the primary outer surface 12b, for instance on the primary outer surface 12b. In other words, the triboelectric layer is associated with the primary sliding path S1.

Hence, if no signal is emitted by the transmission means 50 while the bearing is in operation means that the primary sliding path S1 is in failure.

According to a second embodiment of the present invention illustrated in FIG. 3B, the triboelectric layer can be coated on one of the secondary inner surface 13b and the secondary outer surface 14b, for instance on the secondary outer surface 14b. In other words, the triboelectric layer is associated with the secondary sliding path S2.

Hence, if a signal is emitted by the transmission means 50 while the bearing is in operation means that the primary sliding path S1 is in failure.

In other words, the triboelectric layer in combination with the transmission means make it possible to determine which the primary sliding path S1 and the secondary sliding path S2 is engaged while the bearing assembly is in operation.

Whatever the embodiment considered, a failure detection system 60 (FIG. 1B) may be implemented for receiving the signal that is likely to be emitted by the transmission means 50, via for example a reception means 61. The reception means may comprise a RFID transponder.

In case of failure of the primary sliding path S1, the failure detection system 60 may be configured to emit a default alert 62 indicating that a maintenance be executed on the bearing assembly 10.

Furthermore, the failure detection system 60 can be connected to a prediction module 70 configured to collect the signal received by the failure detection system 60 and calculate the remaining lifetime of the sliding path to which the triboelectric layer is associated with. The calculation of the remaining lifetime may be based on the signal collected by the failure detection system, data related to the design of the bearing 80 and laboratory test data 81 of the bearing.

Besides, depending on the sliding path engaged, the failure detection system 60 can comprise an optimization loop 90 configured to adjust the actuator load operating the bearing.

The bearing assembly according to the present invention, when implemented in an aircraft, and in particular for moving lift and/or flight assisting devices, makes it possible to detect failure at an early stage and before the backup sliding path fails too.

Hence, in addition of safety improvement, it is also possible to repair the bearing assembly before major damages occur.

Furthermore, when implemented in an aircraft, the bearing assembly according to the present invention improve the flight safety.

Furthermore, the detection of failure of the primary sliding path does not requires any inspection.

The systems and devices described herein may include a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bearing assembly of a hinge coupling a first component and a second component, the bearing assembly, comprising:
    an outer ring, mechanically secured to the second component, and having a primary bore extending along a main axis and delimited by a primary inner surface;
    an inner ring, arranged to rotate around the main axis, and having a primary outer surface in sliding contact with the primary inner surface, so as to define with said primary inner surface a primary sliding path associated with a primary friction coefficient, the inner ring further comprises a secondary bore extending along the main axis and delimited by a secondary inner surface;
    an inner shaft, mechanically secured to the first component, the inner shaft being arranged to rotate around the main axis and disposed in the secondary bore, said inner shaft having a secondary outer surface in sliding contact with the secondary inner surface so as to define with said secondary inner surface a secondary sliding path associated with a second friction coefficient;
    wherein one of the primary or the secondary sliding paths includes a triboelectric layer coated on one of the inner and outer surfaces defining the respective sliding path so that when the respective sliding path is engaged the triboelectric layer generates, by friction, an electrical current, and
    wherein the bearing assembly further comprises a transmitter configured to transmit, to a failure detection system, a signal associated with the electrical current that is generated by the triboelectric layer.

2. The bearing assembly according to claim 1, wherein the transmitter comprises a RFID transponder configured to send the signal to a receiver of the failure detection system, and the electrical current generated by the triboelectric layer is used to power the RFID transponder.

3. The bearing assembly according to claim 1, wherein the second friction coefficient is higher than the primary friction coefficient so that the secondary sliding path engages when the primary sliding path fails.

4. The bearing assembly according to claim 1, wherein the signal that is received by a receiver indicates which of the primary sliding path and the secondary sliding path is engaged.

5. The bearing assembly according to claim 4, wherein the triboelectric layer is coated on one of the inner and outer surfaces defining the primary sliding path, so that while the bearing assembly is in operation, if no signal is received from the transmitter by the failure detection system this would indicate that the primary sliding path is in failure.

6. The bearing assembly according to claim 4, wherein the triboelectric layer is coated on one of the inner and outer surfaces defining the secondary sliding path, so that while the bearing assembly is in operation, if a signal is received from the transmitter by the failure detection system this would indicate that the primary sliding path is in failure.

7. The bearing assembly according to claim 4, wherein in case of failure of the primary sliding path, the failure detection system is configured to emit a default alert.

8. The bearing assembly according to claim 4, wherein the failure detection system is connected to a prediction module configured to calculate a remaining lifetime of the respective sliding path with which the triboelectric layer is associated based on the signal received by the failure detection system.

9. The bearing assembly according to claim 4, wherein the fail detection system comprises an optimization loop that adjusts an actuation load applied by an actuator based on the sliding path that is engaged.

10. The bearing assembly according to claim 1, wherein the primary inner surface is spherically concave, and the primary outer surface is spherically convex.

11. The bearing assembly according to claim 1, wherein the triboelectric layer comprises at least one of the chemical compounds chosen among: WCCo, WCCoCr, TiN, CoCrMo, CuAlFe, CuNiIn, Molybdenum, WC—C:H, Nickel Phosphorous, and Chromium plating.

12. The bearing assembly according to claim 1, wherein the second component is a lift or flight assisting device of an aircraft, and the first component is a fuselage or a wing or a fin of the aircraft.

13. The bearing assembly according to claim 12, wherein the second component comprises at least one of the components chosen among:

flap, rudder, and landing gear.

* * * * *